US005391386A

United States Patent [19]

Mally

[11] Patent Number: 5,391,386

[45] Date of Patent: Feb. 21, 1995

[54] APPARATUS AND METHOD FOR TRANSFERRING MULTIPLE FOOD PRODUCT SLICES

[75] Inventor: Timothy G. Mally, Oregon, Wis.

[73] Assignee: Oscar Mayer Foods Corporation, Madison, Wis.

[21] Appl. No.: 123,650

[22] Filed: Sep. 20, 1993

[51] Int. Cl.[6] .......................... A23L 1/00; B26D 7/00; B65B 35/00

[52] U.S. Cl. ...................................... 426/420; 53/244; 53/517; 83/152; 83/154; 83/411.2; 198/428; 271/196; 426/414; 426/518

[58] Field of Search ............... 426/420, 414, 129, 518; 83/152, 154, 411.2; 53/244, 517; 198/428; 271/196

[56] References Cited

U.S. PATENT DOCUMENTS

| | | | |
|---|---|---|---|
| 3,019,578 | 9/1960 | Cohen | 53/123 |
| 3,475,184 | 8/1968 | La Mers et al. | 426/420 |
| 3,907,095 | 9/1975 | Russell et al. | 198/407 |
| 3,978,642 | 9/1976 | Smithers | 53/517 |
| 4,020,614 | 5/1977 | Smithers | 53/517 |
| 4,041,676 | 8/1977 | Smithers | 53/517 |
| 4,532,751 | 8/1985 | Mally et al. | 53/517 |
| 4,832,970 | 5/1989 | Mally et al. | 426/274 |
| 4,960,025 | 10/1990 | Fitch | 83/411.2 |
| 5,051,268 | 9/1991 | Mally | 426/420 |
| 5,149,554 | 9/1992 | Abler | 426/420 |
| 5,174,431 | 12/1992 | Abler | 426/420 |
| 5,299,409 | 4/1994 | Daane et al. | 53/517 |

FOREIGN PATENT DOCUMENTS 0159183 12/1985 European Pat. Off. .

*Primary Examiner*—George Yeung

*Attorney, Agent, or Firm*—Lockwood, Alex, Fitzgibbon & Cummings

[57] ABSTRACT

An apparatus for transferring multiple individual slices of a food product material from a food material supply source which includes a plurality of food product supply sources to a support substrate without substantially altering the predesignated pattern includes a rotating hollow drum disposed on and rotating around a stationary inner core member. The rotating member is disposed between a slicing blade in substrate, negative air pressure is applied to the rotating transfer member to cause individual material slices to adhere to the outer surface of the transfer member in the same pattern in which they are slices from the food supply and to leave the outer surface of the transfer member in the same pattern thereby permitting, in effect, the "printing" of alternating layers of food slices on the substrate. The apparatus has particular utility in the production of premade food set ups having a plurality of alternating layers.

25 Claims, 5 Drawing Sheets

APPARATUS AND METHOD FOR TRANSFERRING MULTIPLE FOOD PRODUCT SLICES

The present invention relates generally to production lines for multiple food product slice assemblies and, more particularly, to a food product slice transfer apparatus which accurately and reliably transfers multiple food product slices which are sliced from a food product supply source having multiple "sticks" of food products without substantially altering the pattern in which the slices are cut from the supply sources.

Various devices are known for the transfer of food material slices in the food preparation field. Typically, such devices are typically concerned with the transfer of single slices in a sequential order. A food product transfer apparatus which relies upon a vacuum generated from its interior to assist it in the transfer of food product slices is set forth in commonly owned U.S. Pat. No. 5,051,268, which issued Sep. 24, 1991. This patent describes a vacuum-based transfer apparatus for sequentially transferring food material strips from a slicer to a substrate by way of a rotating drum. The drum has a vacuum drum in its interior portion and the negative air pressure resulting therefrom causes food product slices to adhere to the outer surface of the drum. Positive air pressure is utilized to assist the food material strips off of the rotating drum onto a moving substrate. However, the apparatus shown in U.S. Pat. No. 5,051,268 describes only a single food supply or stick being sliced at any given time. Such a transfer apparatus is useful in the preparation of sliced packaged products.

Conventional Grote slicers are used in production lines for slicing one or more "sticks" of a meat product held in a reciprocatable food supply storage magazine of the slicer. The magazine reciprocates against a cutting blade and one or more slices of the food product are sliced from the food sticks, dependent on the number of food sticks held in the supply magazine. One drawback to such a conventional slicing system is that the operating speed of the slicer is limited to a predetermined, critical speed. At low operating speeds, the multiple slices cut from the sticks typically fall from the slicer onto a conveyor assembly which may or may not contain a support member or substrate, such as waxed paper. This type of slicing is sufficient for low operating speeds and for instances where the food product sticks are aligned in a side-by-side arrangement rather than arranged in multiple rows. When operated above a critical speed, it has been discovered that food product slices behave more like projectiles rather than slices in that they tend to be flung from the slicer. The resulting placement of such slices is random rather than ordered and thus, if one objective of the slicing operation is to retain the pattern or order in which the food product sticks are arranged in the slicer supply magazine, the slicing mechanism substantially disrupts the prearranged pattern.

In addition, it has been discovered that certain food products, particularly "dry" type meat products such as pepperoni and genoa sausage for example, have a tendency to curl or roll after being cut from the meat supply and dropped from the blade. As they curl and drop from the blade, they are thrown from the slicer and may not reach their intended placement within the target area. Certain cheeses also exhibit this characteristic. All of these types of food products share certain common characteristics. When sliced, the slices thereof do not maintain their integrity in that they do not flow directly out of the slicer in a flat form. Rather, they tend to break or curl because of their thinness or fragile structure. The slices are further subject to forces such as gravitational, inertial, or wind which cause them not to flow directly out and away from the slicing blade. The dryness of these slices imbues them with a certain stiffness which prevents them from laying flat on the substrate. Because they are dry, the slices do not have a normal amount of surface moisture or possess less adhesive fat molecules which promotes a good bond between the slice and substrate. Thus, the slices need to be pressed onto the substrate. Conventional slicers which rely upon gravity to convey multiple food product slices from the blade to a support member do not ensure the exact placement of multiple slices in every slicing action and do not press the slices onto a substrate.

Some attempts have been made at providing food material strip placement systems and have included rotating drums or cylinders in which a vacuum is drawn in the interior of the drum and communicated to the outer surface of the drum, thereby creating an adhesion force on the drum outer surface. These systems are described in U.S. Pat. Nos. 3,978,642, issued Sep. 1976, U.S. Pat. No. 4,020,614, issued May 1977, U.S. Pat. No. 4,041,676, issued Aug. 1977 and U.S. Pat. No. 5,149,554 issued Sep. 22, 1992, the latter two being commonly owned by the assignee of this application.

However, the mechanisms described above are limited to the transfer of single food product slices and have not been utilized in the transfer of multiple food product slices which must be deposited in a prearranged pattern. The transfer of multiple food product slices in a prearranged pattern is particularly useful in certain production lines such as those exclusively dedicated to making what are known as premade "set-ups". Premade set-ups are assemblies of multiple stacks of slices of food products which are applied in layers to compose a final assembly of multiple distinct layers of slices deposited within the target area of a backing member or substrate. Such set-ups are particularly useful in the manufacture of "submarine" style sandwiches having one or more different sliced food products such as meat and cheese.

Such an automated production line is described in commonly owned and copending application, Ser. No. 955,092, filed Oct. 1, 1992 now U.S. Pat. No. 5,299,409. Such systems include multiple slicing stations arranged sequentially along a conveyor assembly, each slicing station having a reciprocatable food supply magazine containing multiple food product supplies or "sticks" in a prearranged pattern. A support member, such as waxed paper, is fed onto the conveyor belt and is moved along the conveyor so that it sequentially passes under each slicing station. A timing mechanism may, in some instances, stop the support member at each slicing station where a layer of slices are deposited onto the substrate. In other instances, the slicing stations and conveyor assembly are synchronized so that the support member, and in particular, a predesignated target area therein, passes underneath each slicing station when each food supply magazine is contacting the knife blade. Each subsequent array or layer of slices is deposited on the support member in a predesignated target area on top of the preceding layer of slices until a complete set-up is built up. The assembled set-ups are wrapped and packaged for shipment to food service retailer, whereupon each premade set-up forms the filling for a sandwich of particular dimensions. These automated production lines operate most efficiently at high speeds of up to 150 slices per minute. One problem indigenous to such automated production lines concerns the placement of food product slices at high speeds, and certain food products, such as pepperoni, genoa sausage and the like, being flung from the slicer and either landing on the set-up substrate outside of the target area thereof or entirely missing the set-up substrate altogether.

The present invention is therefore directed to a food product slice transfer apparatus which avoids the aforementioned disadvantages in which multiple food product slices are simultaneously in substantially the same prearranged pattern in which they appear in the magazine. The invention has particular utility in an automated production line which overcomes the aforementioned disadvantages and which accurately and reliably transfers multiple food product slices. The invention provides beneficial results in the slicing of dry products having less adhesive fat molecules in that the dry slices are pressed down onto a substrate or preceding layer of slices. The present invention further accelerates and directs the multiple slices at higher speeds than if the slices freely fell into a target location, thereby permitting higher production speeds for automated production lines.

Accordingly, it is an object of the present invention to provide an improved means for transferring multiple food product slices arranged in a predetermined pattern from a slicing location to a deposit location on a traveling substrate without substantially altering the pattern.

Another object of the present invention is to provide an improved vacuum transfer apparatus for the assembly of premade food product set-ups, wherein the apparatus includes a plurality of slicing stations each having a food product supply magazine with multiple sticks of food products arranged in a preselected pattern wherein at least one of the slicing stations includes a rotating transfer mechanism having pneumatic means communicating with an outer surface of the transfer mechanism to provide negative air pressure to same and to create thereon a zone of adhesion to retain the multiple slices in their preselected pattern during transfer and which "prints" them onto a substrate in a predetermined pattern.

Yet another object of the present invention is to provide a transfer means for transferring multiple food product slices in each slicing action at a slicing station wherein the transfer means presents a rotating, curved surface disposed closely adjacent to supply of multiple food products.

Yet another object of the present invention is to provide an improved means for transferring food product slices arranged in a predetermined pattern from a first location to a second location, wherein the first location is a slicing area where such slices are sliced from multiple food product sticks and the second location is a support member, the improved transfer means comprising a cylindrical rotating transfer member having its outer surface positioned proximate to the slicing station such that slices cut from said food product sticks do not have the chance to curl of the cutting, the transfer member outer surface being position closely adjacent to the slicing knife and further being positioned closely adjacent the substrate, the transfer mechanism having an interior pneumatic means communicating negative air pressure to the transfer member outer surface to create a zone of adhesion for the slices on the transfer member outer surface, the transfer member further having means for selectively blocking the negative air pressure.

These and other features, objects and advantages of the present invention will become more apparent from a reading of the following detailed description.

The present invention accomplishes these objectives by utilizing a rotating transfer means, preferably in the form of a rotating member having a curved outer surface, which is positioned between a multiple food stick slicer mechanism having a food supply magazine containing a plurality of distinct food sticks in a preselected pattern. The magazine is reciprocated back and forth in cycles in and out of contact with a slicing blade. The vacuum transfer drum is cylindrical and has a plurality of holes extending through its exterior surface arranged in a preselected pattern. When a vacuum is drawn in the interior of the drum, it securely holds all of the multiple slices to the drum's outer surface in the same pattern as in the food supply magazine. The vacuum drum is positioned so that a vacuum occurs at the outer surface opposite the slicing blade where the slices are cut and continues until the slices are positioned above the substrate. The vacuum is stopped at that point so that the multiple slices no longer adhere to the transfer drum.

The vacuum permits the transfer drum to capture the slices on its outer surface as they are sliced from the food sticks contained in the supply magazine in the same position as arranged in the supply magazine and subsequently to transfer the same to the substrate in the same position. Consequently, the positioning of multiple slices of the food products as they are sliced and transferred is not altered. Additionally, the speed at which the drum rotates may be varied in accordance with the slices speed to ensure accurate placement of slices on successive substrates.

These and other features and objects of the present invention will become more apparent from a reaching of the following detailed description.

BRIEF DESCRIPTION OF THE DRAWINGS

In the course of this description, reference will be made to the attached drawings wherein like reference numerals identify like parts and wherein.

DETAILED DESCRIPTION OF THE INVENTION

The Slicing-Placement Apparatus

Figure 1B:
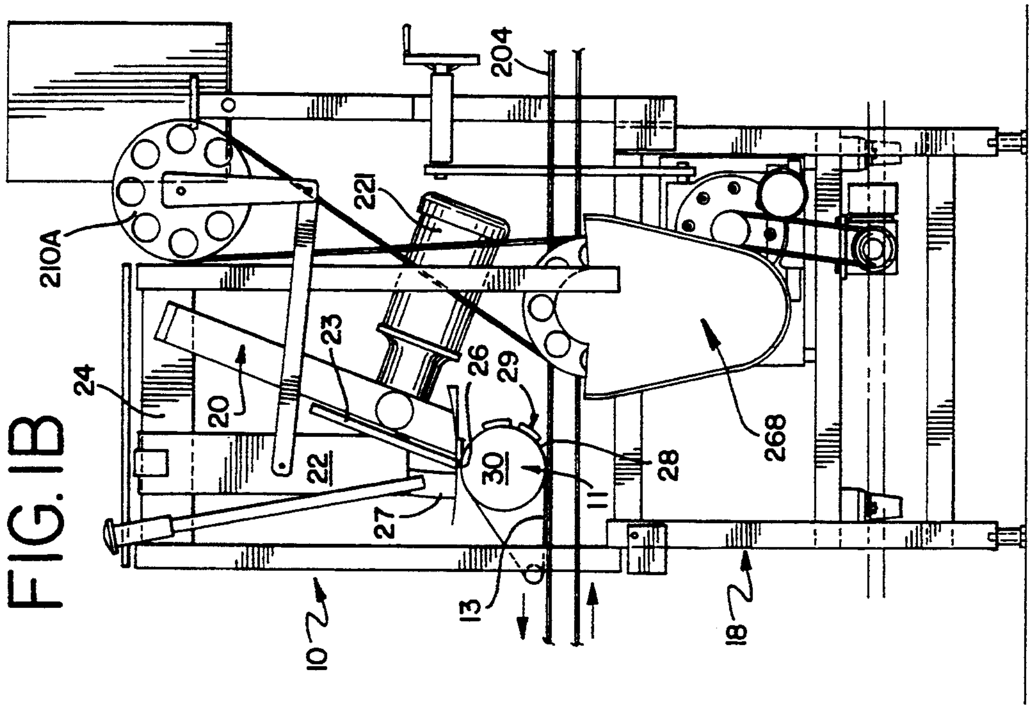
FIG. 1B is an elevational view of a multiple food product slice mechanism modified to include a multiple food product slice transfer mechanism constructed in accordance with the principles of the present invention.
Figure 1A:
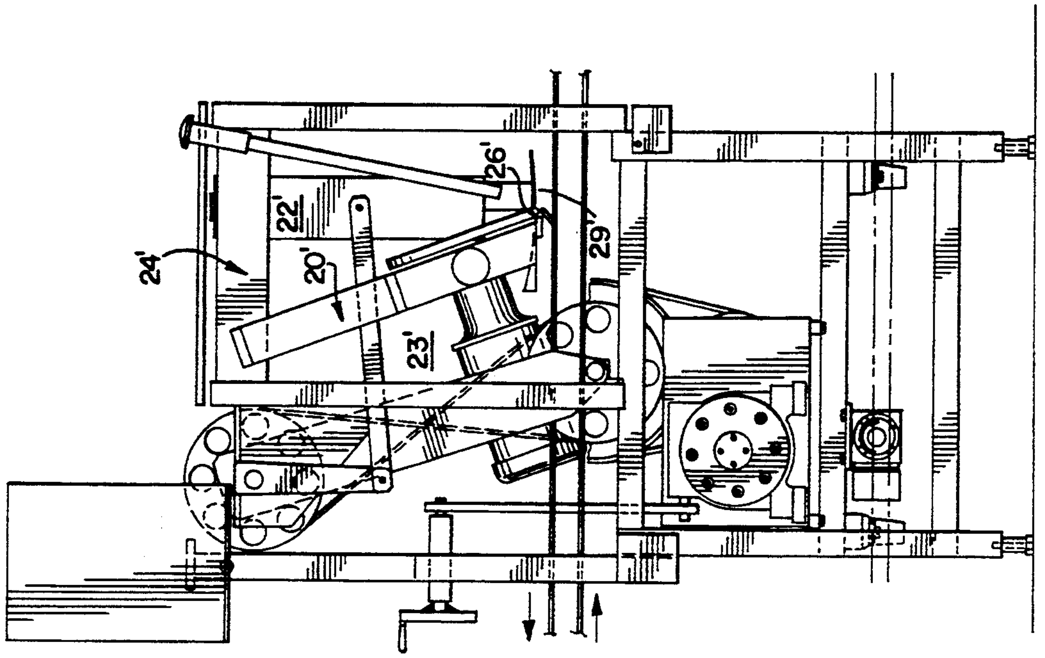
FIG. 1A PRIOR ART
FIG. 1A is an elevational view of a conventional reciprocating multiple food product slice mechanism.
Figure 2:
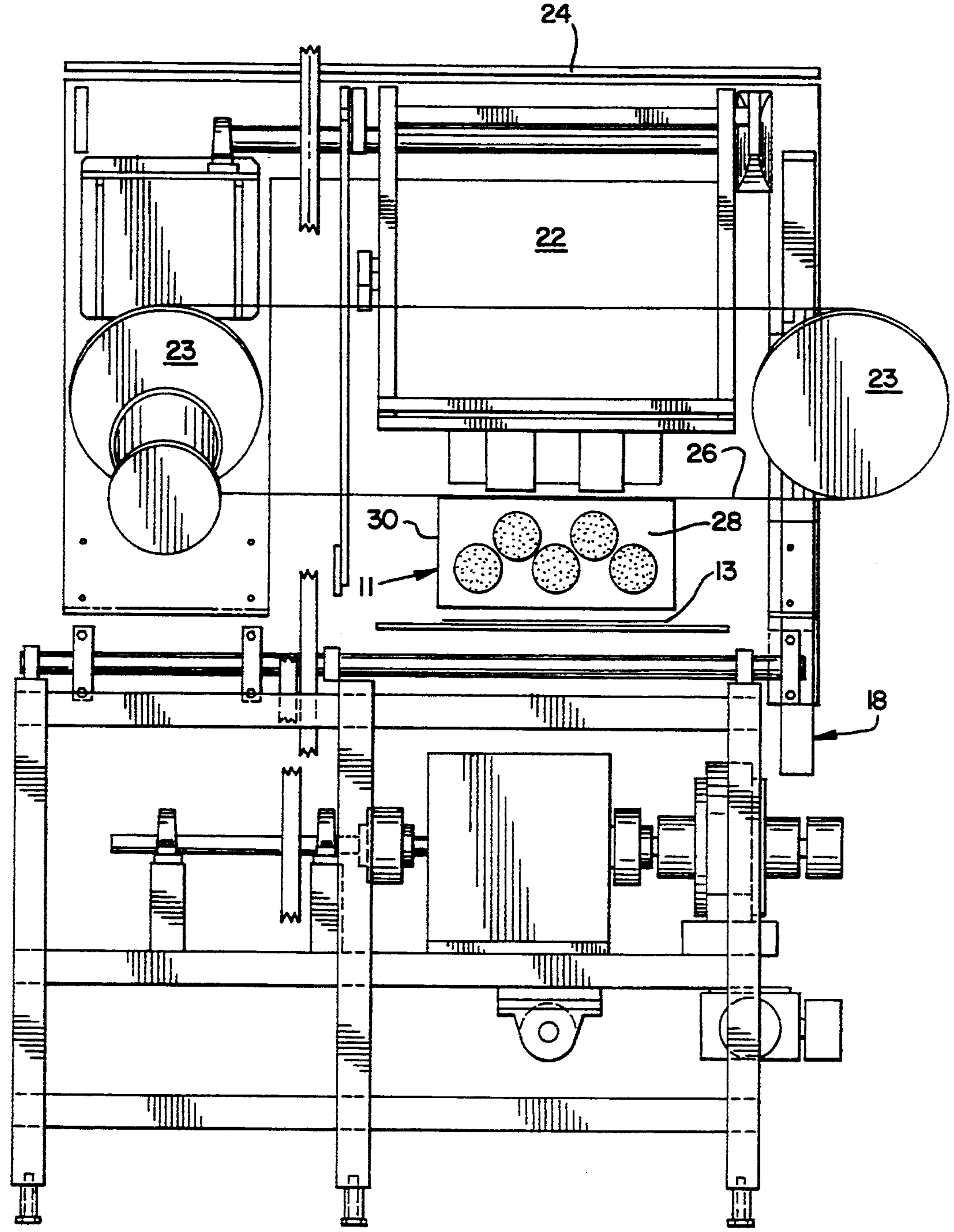
FIG. 2 is an end view of the mechanism of FIG. 1B.

A multiple food product slicing-placement apparatus 10 constructed in accordance with the principles of the present invention is illustrated in FIGS. 1B and 1C. The apparatus 10 is preferably used as part of an overall production line 12 (FIGS. 5A & 5B) which in turn is used to create food product assemblies 14 consisting of discrete, multiple food product slice layers 16 deposited on a support member 13, such as waxed paper. The apparatus 10 is located within a combined slicing-placement station 18 of the production line 12 at a location where "dry" type or fragile food products are sliced in multiple slice arrangements. The term "dry" is intended to refer to food products which do not contain sufficient surface moisture or sufficiently adhesive fats to form a bond to a substrate, while the term "fragile" refers to slices of food products which are thin or have a fragile structure which causes them to break or curl after slicing. Examples of certain food products which exhibit these characteristics are pepperoni and genoa sausage. The slicing-placement station 18 includes a slicer mechanism 20 having a food product supply magazine 22 pivotally mounted within an overall structural frame 24. The magazine 22 reciprocates in the frame 24 between a cutting movement and a recycle, or reset, movement. In the cutting movement, the magazine 22 contacts a slicing blade 26 as it moves in one direction and in the reset movement, the magazine 22 swings in the opposite direction out of contact with the slicing blade 26.

As the magazine 22 reciprocates, the multiple food product sticks 27 are extended slightly out of the magazine 22 and come into contact with the slicing blade 26. The blade 26 may either be stationary or it may be part of a continuous blade assembly which rotates on drive gears or pulleys 23 to present a moving cutting surface to the food product sticks 27. As the food sticks 27 contact the blade 26, multiple slices 29 begin to form along the leading edges of the blade 26. While the cutting of the slices is occurring, a slice transfer means 11, shown as a rotatable drum 30, is rotating in synchronization With the magazine 22 at a speed which cooperates with the speed of the magazine 22. As cutting progresses, the leading edges of the multiple slices 29 extend downwardly near the exterior transfer surface 28 of the transfer drum 30.

Figure 4A:
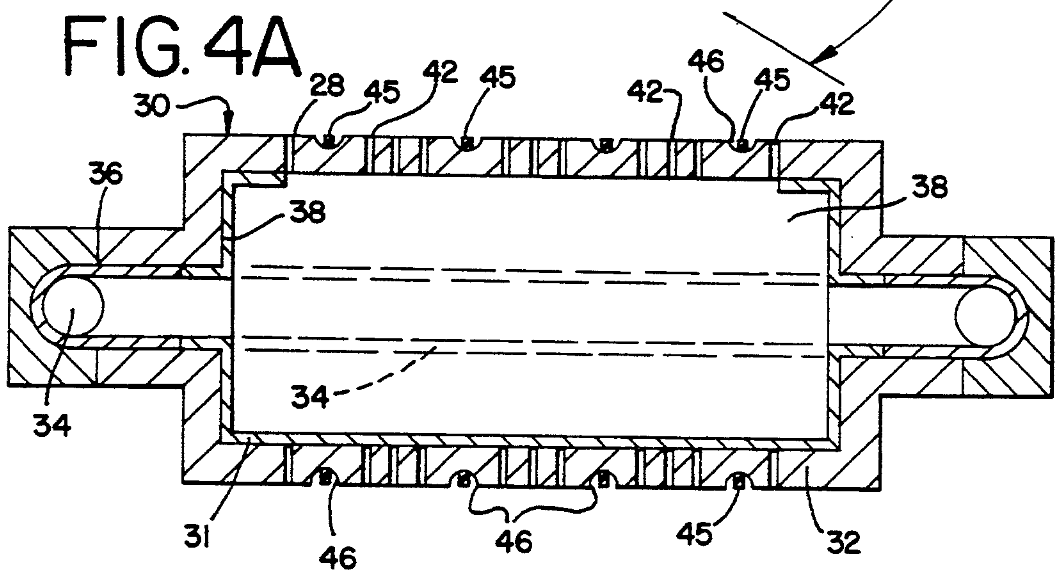
FIG. 4A is a transverse cross-sectional view of the multiple food product slice transfer mechanism of FIG. 1B.
Figure 4B:
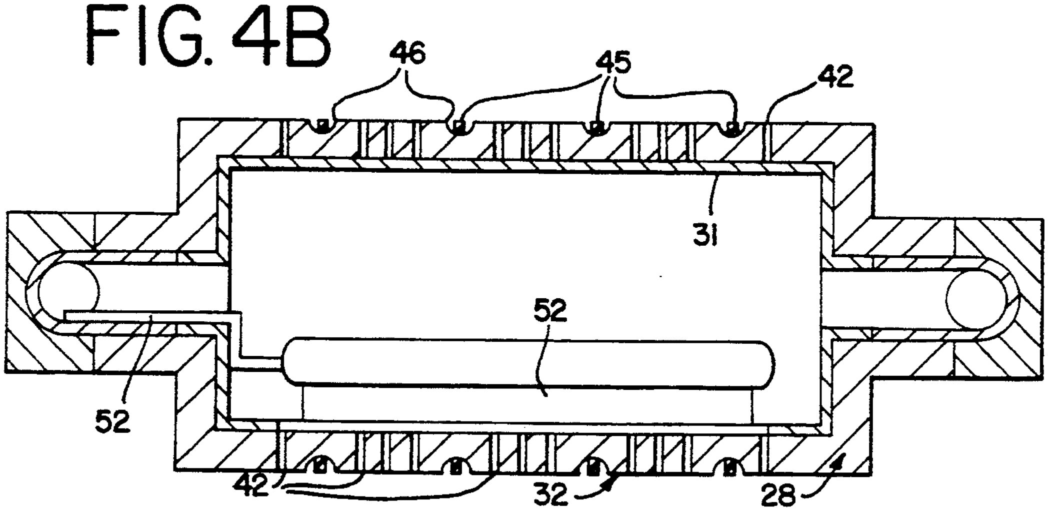
FIG. 4B is a transverse cross-sectional view of an alternative embodiment of a multiple food product slice transfer mechanism constructed in accordance with the principles of the present invention.

The transfer drum 30 may have two operational components. The first of these two components is a non-rotating inner core 31 and the second component is an outer member 32, illustrated as drum 30, which rotates around the inner core 31. The inner core 31 has a configuration generally complementary to that of the rotating member 32, in this instance, cylindrical. The inner core 31 preferably extends for the entire length of the rotating member 32 as shown in FIGS. 4A and 4B, and includes a pneumatic means such as one or more conduits, or other piping 34, which is mounted to the frame 24 of the slicing-placement station 18 and supplies negative air pressure to the inner core 31 and the interior of the transfer means 11. Although illustrated as terminating adjacent an end portion 36 of the inner core 31, it will be understood that the conduit 34 may include alternate means of communicating with the inner core 31 such as by way of a manifold arrangement (not shown).

Figure 3:
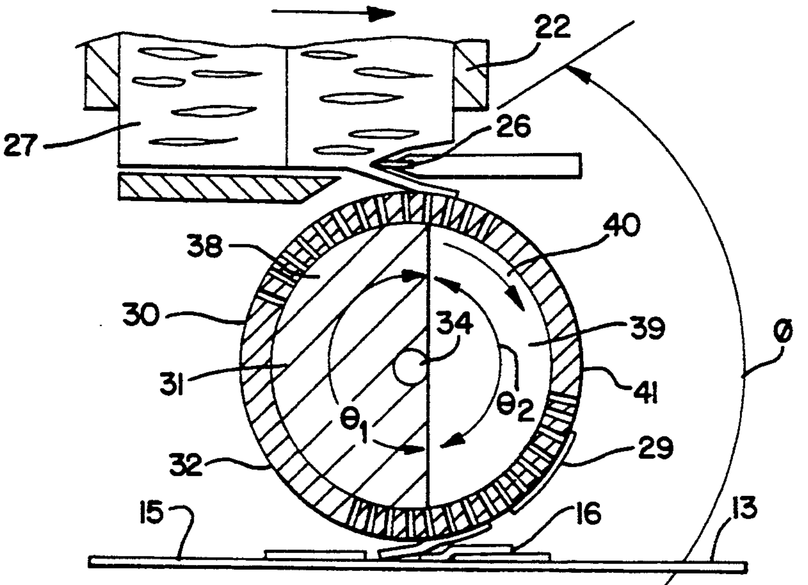
FIG. 3 is an enlarged cross-sectional view of the multiple food product slice transfer mechanism taken near the point of operative intersection between the rotating transfer member and the slicing knife.

The inner core 31 has a shield portion 38 which extends along a predetermined arc length $\theta_1$ to define an open portion 39 of the inner core 31 which extends for the remainder of the circular extent of the inner surface of the rotating member 32, indicated by angle $\theta_2$. (FIG. 3) This open portion 39 forms a passageway 40 by which the negative air pressure supplied by conduit 34 communicates with the outer rotating drum 30. The inner core 31 is fixed in relation to the outer rotating drum 30 so that the conduit 34 creates a vacuum force which defines a zone of adhesion 41 on the outer transfer surface 28 wherein the multiple food slices 29 are adhered to the rotating member and are subsequently rotated through a transfer path equivalent to arc length $\phi$ which is generally equivalent to $\theta_2$ and which begins near the point of contact between the food supply magazine 22 and the slicing blade 26 and extends to approximately near the point of operative intersection with the support member 13.

The outer rotating member 32 is generally cylindrical in nature and has an outer transfer surface 28 to which the multiple food slices 29 are adhered in the same pattern as their respective multiple food supply sticks 27 are arranged within the food supply magazine 22. In order to communicate the negative air pressure or vacuum from the inner core member 31 to the outer transfer surface 28 of the rotatable drum 30. The outer transfer surface 28 is preferably provided with a plurality of air apertures 42 which extend through the rotating drum 30 to provide a pathway for the negative air pressure generated in the inner core 31 to reach the outer transfer surface 28. The apertures 42 may be arranged on the rotatable drum 30 in either a predetermined pattern to define specific slice receiving portions on the transfer surface 28 as disclosed in my earlier U.S. Pat. No. 5,051,268 (the disclosure of which is herein incorporated by reference) or they may extend over the entire transfer surface 28. Whatever the pattern chosen for the apertures 42, the number of apertures 42 should preferably be enough to ensure that a sufficient vacuum force is created on the transfer surface 28 to effect the transfer of the entire layer 16 of multiple slices 29 without substantially altering the arrangement of the slices 29 relative to each other.

The shield 38 of the inner core 31 serves as a block which cuts off the vacuum communicated to the outer transfer surface 28. This occurs when the rotatable drum 30 passes over the shield 38 during rotation, so that the slices 29 are released sequentially and deposited onto either the support member 13 itself or a layer of slices 16 previously deposited thereon. As additional assistance in ensuring the removal of slices 29 in their predetermined arrangement, a series of bands 45 may encircle the rotating outer member 32 within a series of circumferential channels 46 axially spaced apart along the length of the rotating member 32. These bands 45 engage at least one pulley 47 operatively associated with the rotating member 32 and spaced apart from it. As illustrated, the bands 45 preferably enter the channels 46 before the point of operative intersection with the slicing blade 26 and supply magazine 22 and subsequently exit the same near to or at the point of operative intersection with the support member 13. The speed at which the bands 45 are driven is preferably synchronized with the speed at which a conveyor belt 50 is driven such that the multiple food slices 29 follow the movement of the support member and particularly a predesignated target 15 area defined therein.

As an alternative to the inner core shield 38 for blocking the negative air pressure to the rotatable drum 30, the inner core 31 may also include an additional pneumatic means which supplies positive air pressure to the rotating member apertures 42 to urge the multiple food slices 29 off of the outer transfer surface 28. Such a means may take the form of a simple positive air pressure conduit 52 or manifold (not shown) which directs positive air pressure to the transfer surface 28 located near the intended transfer point.

Alternate Transfer Means

Figure 4C:
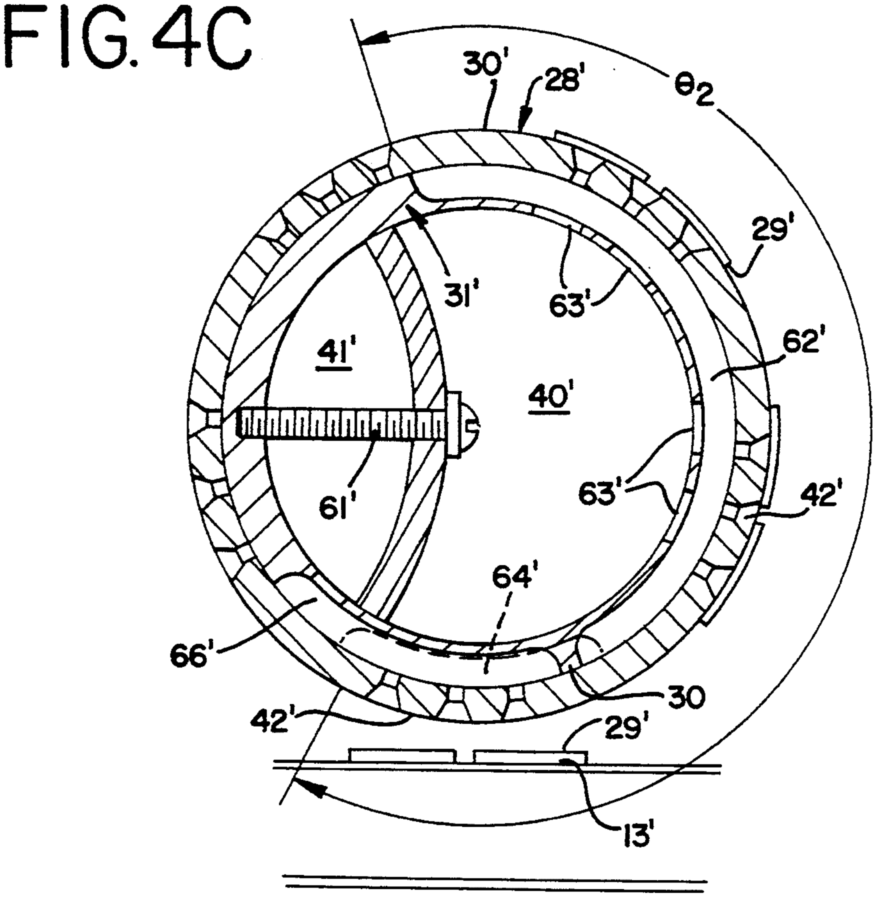
FIG. 4C is a cross-sectional view of another alternate embodiment of a multiple food product slice transfer mechanism constructed in accordance with the principles of the present invention.

In lieu of such a single conduit 52, an alternate slice urging means may also utilize a structure similar to that shown and described in commonly owned U.S. Pat. No. 5,149,554, the disclosure of which is incorporated herein by reference. In that regard, as illustrated in FIG. 4C, the inner core 31' is fixed against rotation within the outer rotatable drum 30' and is adapted for axial movement within same. This axial movement takes the form of an oscillating or reciprocating movement between opposing ends of the rotatable drum 30' within the frame of the slicing-placement apparatus 10. In this alternative embodiment, the inner core 31' takes the form of a cylindrical drum, the outer diameter of which closely matches the inner diameter of the outer drum 30', such that an effective pneumatic seal is obtained between the inner core 31' and the outer drum 30'.

Two air passageways or plenums 40', 41' are defined within the transfer means 11' which plenums 40', 41' extend for substantially the entire axial extent of the inner core 31' and are separated by a wall or barrier 60' which is shown attached to the inner core 31' by bolts 61'. The attachment may also be effected by any other suitable means such as by welding. As stated previously, the inner core 31' has a substantially cylindrical construction and includes a recessed area 62' in its outer surface extend along the arc length between a adherence position near the slicing blade and a deposit position near the support member 13'. The recessed area 62' may extend for substantially the entire axial length of the inner core 31' or it may be divided into discrete sections axially spaced apart for the length of the inner core 31'.

The recessed area 62' includes a plurality of extensions or grooves 64' axially spaced apart on the inner core 31' which are separated by intervening positive air pressure grooves 66'. The grooves 64' communicate with the inner core exterior surface recessed area 62' which, in turn, communicates with the vacuum drum in the interior of the inner core 31' by way of openings 63' in the inner core wall (FIG. 4C). The positive air does not communicate with the inner core 31' where the vacuum is drawn, but rather communicate with the second plenum 41' which is connected to a positive air pressure source in a conventional manner. During operation, as explained in U.S. Pat. No. 5,149,554, the inner core 31' is axially displaced when the multiple slices 29' are ready to be deposited onto the support member 13' or any layers 16' of slices previously deposited thereon such that positive air pressure is communicated to the exterior transfer surface 28' of the rotatable drum 30' by way of the apertures 42' present in the rotatable drum 30'. Because the inner core 31' reciprocates within the outer drum 30', the position of the multiple slices 29' is not altered from side-to-side, but rather is still maintained in order from slicing, through transfer and ending in deposit onto the support member.

Those skilled in the art will understand that various different arrangements of slice placement designs onto the support member are possible, and are limited by only the number of food slicing stations 210, the selection of food products and the capacity of the supply magazine of the slicers.

Application of the Transfer Means to an Automated Production Line

The present invention has particular utility when used in methods and assembly lines engaged in the preparation of premade food "set-ups" or assemblies wherein a plurality of distinct food product slice layers are deposited sequentially on a substrate such as wax paper or the like. Each set-up includes multiple food product slice layers deposited on top of each other by distinct slicing stations arranged in sequential order. Once made, the set-ups may be wrapped in paper and packaged for shipments to points of sale which are typically food service retailers. These set-ups are particularly helpful to a point of sale food service retailer in the making of submarine type sandwiches in that they reduce the amount of manual labor to the retailer involved in assembling such a sandwich as well as providing the sandwich food product fillings at target weight range.

Figures 5A, 5B:
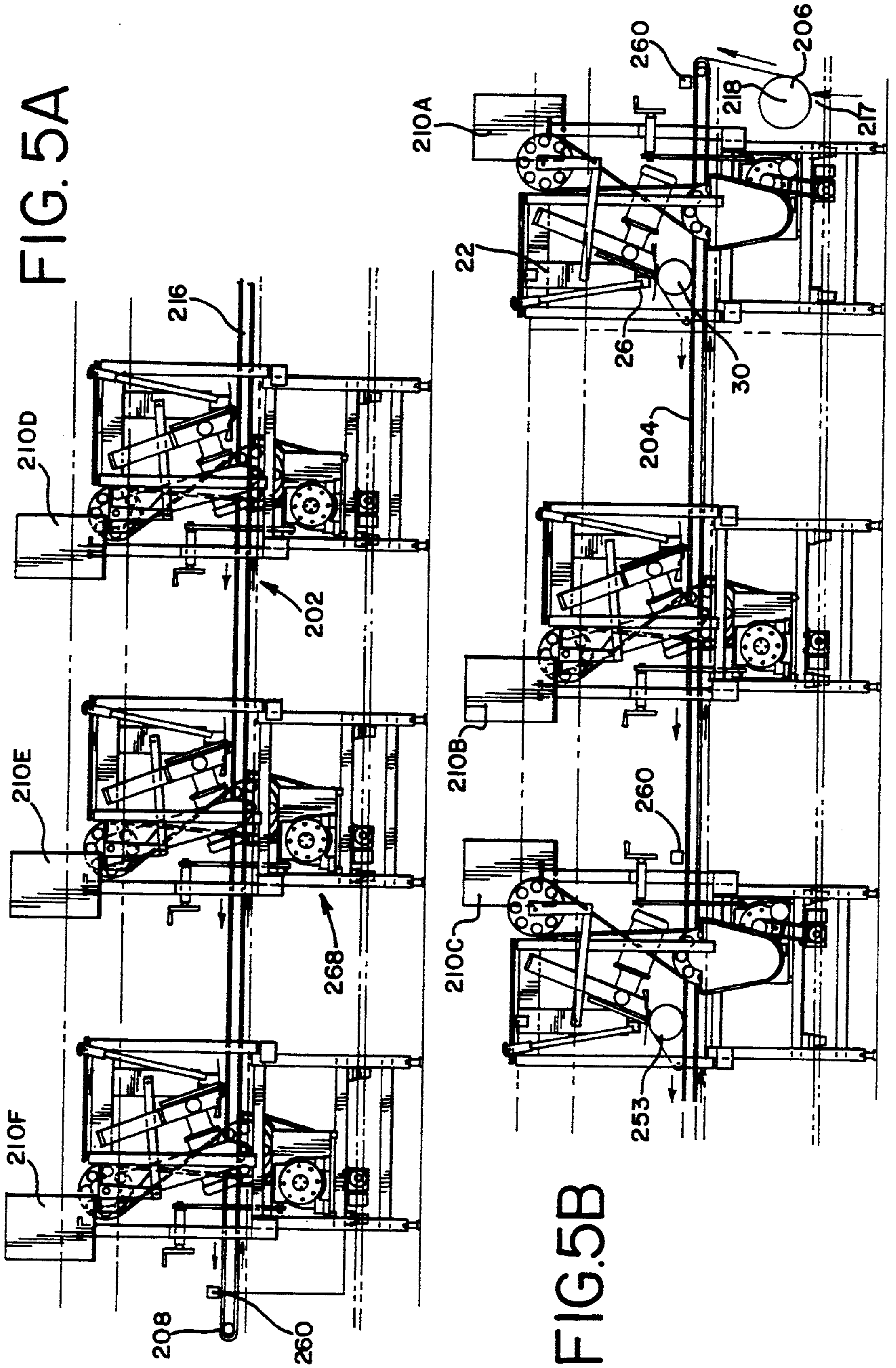
FIG. 5A and 5B, as combined along the indicated center lines, provide a side elevational view of a layered food-substrate assembly line incorporating the multiple food product slice transfer mechanism according to the present invention.

Returning to the drawings, it can be seen that FIGS. 5A & 5B generally illustrate an overall system for automated assembly of such premade "set-ups" utilizing a transfer means described above. The system incorporates a production line 200 which includes a conveyor assembly 202 having an endless belt 204 extending between opposing ends of the conveyor assembly 202 beginning with an input end 206 and terminating in an output or discharge end 208. The endless belt 204 is conventional in that it may either include a single belt having a width spanning between the frame members 209 of the conveyor assembly 202 or it may include a plurality of spaced apart flexible bands (not shown). Whatever the structure of the belt 204, it is desirable that the belt 204 have a width sufficient to accommodate the set-up assemblies 201 and to adequately support the substrate upon which the set-up assemblies are deposited throughout the assembly line 200.

A plurality of food product slicing stations 210A–F are arranged sequentially in a spaced-apart fashion along the conveyor belt 204. These slicing stations serve to deposit distinct layers 212A–212F of multiple food product slices 214 onto a support member or substrate 216, such as the web 217 of backing paper shown, which is feed to the conveyor assembly 202 at its input end 206 by a suitable web feeding means 217, such as conventional drive rollers 218. The number of distinct slicing stations 210A–210F may vary in number according to the number of slice layers 212 desired in the final assembly 201. All of the distinct slicing stations 210A–210F may be arranged on the assembly line 200 and utilized in the production process or some of the slicing stations may be deactivated and not actively deposit any food product slices on the substrate when it passes through the respective slicing stations 210A–210F. Although the description which follows is described in terms of a production line 200 having six such slicing stations 210A–210F, it will be understood that the invention is not limited to the number of slicing stations.

Focusing on one slicing station 210A of the production line 200, (shown in enlarged detail in FIG. 1B) it can be seen that the slicing station 210A includes a frame 24 which mounts the station 210A over the conveyor belt 204 in position to deposit food product slices thereon. The slicer portion 18 of the station 210A includes a slicing knife, shown as a rotating knife band 26 which extends generally transverse to the conveyor belt 204 and is spaced apart from it in the vertical direction. The band knife 26 is driven by suitable means such as a motor 221. A food product supply magazine 22 is reciprocatably mounted to the slicing station frame 24 and in proximity to the slicing knife 26 such that when the magazine 22 reciprocates back and forth over the conveyor belt 204, it operatively engages the knife 26. The reciprocating magazine 22 is dimensioned to accommodate a plurality of food product supply "sticks" 27 which are typically cylindrical log-like members of a dry or fragile food product. The food product supply members need not be cylindrical in cross section, but may be any preferred and utilizable shape such as rectangular, square or the like.

The multiple food product sticks 27 are assembled into the magazine and are fixed in place therein in a preselected pattern by a suitable means which fixes the position of the food product supply sticks 27 relative to each other in the horizontal direction. Each food product stick 27 individually incrementally displaces in the vertically within the supply magazine 22, so that the sticks 228 also displace together as an entire unit during the slicing process. By virtue of this displacement, the magazine 22 presents constant food product supply source to the slicing knife 26.

The reciprocating magazine 22 is suitably driven in synchronization with the conveyor assembly 204 by way of a line shaft and cam assembly 268. A suitable slicer construction is known in the trade as a Grote slicer available from the J. E. Grote Pepp-a-matic Company of Columbus, Ohio. The details of such a reciprocating slices assembly are set forth in a commonly owned and copending application, Ser. No. 955,092 filed Oct. 1, 1992 (U.S. Pat. No. 5,299,409) and entitled "Automated Line and Method for Preparing Premade Food Set-ups", the disclosure of which is herein incorporated by reference.

A rotating transfer mechanism 11 having a rotating transfer member 30 as described in detail above is interposed between the conveyor belt 204 and the slicing knife 26, so that when the multiple slices 29 fall a very short distance onto the outer surface 28 of the transfer member 30, they are adhered thereto by the vacuum generated within the member 30. The slicing and adhesion of the food product slices 29 is accomplished without substantially altering the prearranged pattern of placement of the food product sticks 27 held in the food magazine 22. Once on the outer surface 28 of the rotating member 30, the multiple food product slices 29 traverse the distance between the slicing knife 26 and the substrate 13 carried by the conveyor belt 204 by rotating on the outer surface 28 thereof for a predetermined arc length corresponding to the distance between the point where the slicing knife 26 deposits the multiple food product slices 29 on the transfer member outer surface 28 and the point where the slices 29 are urged off of the transfer member 30 on to the conveyor 204. The serial slicing stations 210A–F are synchronized with the conveyor belt 204 so that the substrate 13 stops underneath the slicing area of each station. In this regard, the production line may also include conventional sensing means such as photo-optical or photo-electric sensors 260 disposed at the beginning and end of the production to determine start and stop movements of the conveyor, as well as at each slicing station 210A–F to enable the line to independently initiate a slicing and transfer cycle.

The vacuum assisted transfer means 11 described above, when used in conjunction with such a slicer mechanism, assists the slicer in accurately transferring multiple food product slices without substantially altering the pattern in which they are arranged in the supply magazine. This benefit advantageously permits the automated construction of premade food set-ups, which heretofore was a manual labor intensive assembly process. The end result is that multiple slices are "printed" onto a specific target area on a support member passing on the associated conveyor.

These multiple slices are printed within the specific target area in the same pattern in which the food supply sticks are held within the slicer supply magazine so that such set-ups may be designed from the supply end of the system. Additionally, such a system overcomes the problem of certain dry or fragile products such as pepperoni or genoa salami which tend to roll or curl when dropped from a slicing blade. The present invention permits multiple slices of this type meat to be sliced simultaneously. Inasmuch as the outer curved transfer surface of the vacuum transfer drum captures the slices before they begin to curl excessively, the transfer drum permit permits the mechanism to critically control the placement of these slices, thereby allowing higher production speeds of approximately 150 set-ups per minute.

OPERATION OF THE PRESENT INVENTION

Figure 6:
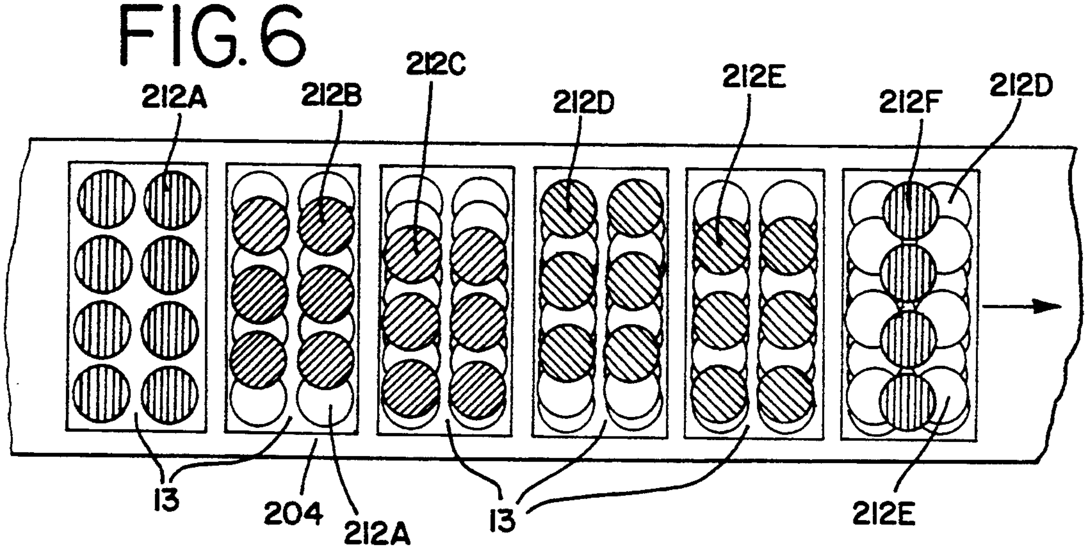
FIG. 6 is a plan view of a final food slice assembly or pre made set-up formed by the sequential layering of multiple food product slices effected by the production line of FIGS. 5A and 5B.

In operation, the first slicing station 210A slices a first distinct layer 212A of multiple food product slices 27 which fall onto the substrate or support member 13. (FIG. 6) The substrate 13 then proceeds to the next slicing station 212B where the slicing knife 26 engages the multiple food product supply members 27 of the second slicing station and slices a second, distinct layer 212B of food product slices 214 which forms the second layer of the assembly. The food slice-substrate assembly continues through subsequent slicing stations 210C–210F to receive additional distinct slice layers 212C–212F until the assembly comprises a vertically layered mass of food product slices arranged in a predesignated pattern on the substrate.

In operation of the present invention when used on a premade set-up line as described above, the transfer member 30 preferably contacts the substrate 13 to "imprint" or otherwise press the multiple food product slices 29 onto the substrate. In this regard, the vertical spacing between the transfer member 30 and the substrate will be adjusted at each station such that contact between the two is continuous. The rotating transfer member 30 rotates at a speed synchronized by way of a conventional control means to the reciprocating magazine such that the food product slices 27 are vacuumed onto the transfer member at the correct time for the slicer mounted above the drum and then subsequently printed onto a stack of previous slices arranged within the target area on the continuously moving support paper. In testing, it has been found that the transfer mechanism can deliver as many slices per deposit as there are sticks of food products in the slicer (typically six), therefor resulting in a total of approximately 900 slices per minute.

At high speeds, the present invention virtually allows the printing of multiple food product slices onto a support web and the layered food product assembly it carries.

It will be seen that while certain embodiments of the present invention have been shown and described, it will be obvious to those skilled in the art the changes and modifications may be made therein without departing from the true spirit and scope of the invention.

I claim:

1. An apparatus for transferring a plurality of food product slices arranged in a prearranged pattern, the plurality of slices being cut by a slicing means from a multiple food product supply containing multiple food product supply members and transferring the slices to a predesignated deposit location without substantially altering positions of said multiple food product slices relative to each other, comprising:

means for holding said multiple food product supply members in a arranged pattern;

means for slicing said multiple food product supply members into discrete, multiple food product slices;

means for transferring said multiple slices after slicing onto a substrate without substantially altering said prearranged pattern, said transfer means including a rotating member having an exterior transfer surface containing a plurality of apertures disposed thereon, the apertures extending from the transfer surface to interior of the rotating transfer member, means for supplying negative air pressure to said transfer member exterior surface to adhere said multiple food product slices to said transfer surface after slicing while maintaining said slices in said prearranged pattern on said transfer member between first and second transfer positions, the first transfer position being proximate to said multiple food product supply member and the second transfer position being proximate to said substrate, said transfer member further including means for assisting the removal of said multiple food products slices from said transfer members onto said substrate in said prearranged pattern, said transfer member contacting the substrate during rotation thereof.

2. The apparatus of claim 1, wherein said slice removal means includes means for blocking said negative air pressure within said rotating transfer member proximate to said substrate.

3. The apparatus of claim 1, wherein said slice removal means includes a plurality of band means encircling said rotating transfer member and engaging said multiple food product slices disposed on said rotating transfer member exterior surface proximate to said substrate.

4. The apparatus of claim 2, further including a plurality of bands encircling said rotating transfer member and engaging said multiple food product slices disposed on said rotating transfer member exterior surface proximate to said substrate.

5. The apparatus of claim 1, further including means for supplying said substrate to said transfer means, said substrate having a predefined target area, whereby said transfer means deposits said multiple slices onto said substrate in said predesignated pattern within said target area.

6. The apparatus of claim 1, wherein said rotating member includes an inner core, said inner core including a plenum which supplies negative air pressure to said inner core, said rotating member apertures communicating with said inner core to supply negative air pressure to said transfer surface to create a zone of adhesion on said transfer surface sufficiently large enough to receive said multiple food product slices in said prearranged pattern.

7. The apparatus of claim 6, wherein said inner core includes a means for shielding said rotating member from said negative air pressure for a predetermined amount of rotation of said rotating member.

8. The apparatus of claim 6, wherein said inner core includes a plenum which selectively supplies positive air pressure to a portion of said rotating member transfer surface to urge multiple slices adhered thereto off and onto said substrate.

9. The apparatus of claim 1, further including means for urging said multiple food product slices from said transfer means to said substrate in said predetermined pattern.

10. The apparatus of claim 9, wherein said rotating member includes an inner core that reciprocates within said rotating member, said slice urging means including a source of positive air pressure operatively associated with said inner core which provides positive air pressure to said rotating member when a multiple slice receiving portion of said rotating member is proximate to said substrate.

11. The apparatus of claim 1, wherein said multiple food product supply members are dry food products unable to form a bond with said substrate without being pressed down on said substrate.

12. The apparatus of claim 9, wherein said slice urging means includes a plurality of belts operatively engaging said transfer means, said belts traveling at approximately a speed equal to a speed of travel of said support member.

13. An apparatus for preparation of food slice assemblies wherein each of the food slice assemblies includes a substrate and a plurality of distinct layers of multiple food product slices deposited on the substrate in a variety of predesignated patterns, the apparatus comprising, in combination:

a conveyor assembly having an input end and an output end, the conveyor assembly including means for endlessly interconnecting said input end and output end by way of an endless belt;

first and second slicing stations positioned sequentially along said conveyor assembly, each of said slicing stations including means for slicing multiple food product slices from a food product supply source, means for supplying a substrate to said conveyor assembly and to said first and second slicing stations in sequential order, said first station slicing means depositing a first layer of multiple food product slices in a predetermined pattern onto said substrate wherein said multiple food product slices of said first layer are arranged with respect to each other, said second station slicing means depositing a second layer of multiple food product slices in a second predetermined pattern onto said substrate to define two separate layers of multiple food product slices on said substrate in two predetermined patterns, at least one of said slicing means including means for transferring said slices from said slicing means to said substrate without substantially altering the predetermined pattern of said slices during transfer, said transfer means including a rotating member, said rotating member including pneumatic means for supplying negative air pressure to an outer surface of said rotating member to thereby adheres said slices in said respective predetermined pattern after slicing to said rotating member outer surface, said apparatus further including means for urging said predetermined pattern off of said rotating member outer surface and onto said substrate without substantially altering said predetermined pattern.

14. The apparatus of claim 13, wherein said rotating member is mounted on an inner core member, said inner core member including first and second plenums, said first plenum supplying negative air pressure to a portion of said rotating member and said second plenum selectively supplying positive air pressure to another portion of said rotating member.

15. The apparatus of claim 13, further including means for synchronizing said first and second slicing stations such that said second layer of multiple food slices is deposited on top of said first layer of multiple food slices.

16. The apparatus of claim 13, further including additional slicing stations, each of the additional slicing stations having a means for slicing multiple food products held in a magazine operatively associated therewith.

17. The apparatus of claim 16, wherein at least one of said additional slicing stations includes a rotating transfer means operatively associated therewith for transferring said multiple food slices from said food product supply to said substrate.

18. The apparatus of claim 13 wherein said substrate includes a paper web and said apparatus further includes means for supplying a continuous web of paper sequentially to said first and second slicing stations.

19. The apparatus of claim 13, wherein said rotating member includes a non-rotating inner core, said inner core being in communication with a source of negative air pressure and a source of positive air pressure, whereby during rotation of said rotating member and transfer of said multiple food product slices, negative air pressure is selectively applied to said rotating member and positive air pressure is selectively supplied to said rotating member to urge said slices off of said rotating member.

20. The apparatus of claim 19, wherein said non-rotating inner core reciprocates axially within said rotating member to alternately communicate negative and positive air pressure to the exterior of said rotating member.

21. A method of transferring an array of food product slices consisting of multiple food product slices arranged in a preselected pattern onto a moving substrate without substantially altering the pattern, comprising the steps of:

providing a food supply source having a plurality of food product supply members arranged within said supply source in said preselected pattern;

providing a rotating member having a generally arcuate outer transfer surface proximate to the food supply source, the rotating member having means communicating a source of negative air pressure to a portion of said transfer surface;

applying negative air pressure to said transfer surface portion to adhere an array of food product slices cut from said plurality of food product supply members in said preselected pattern;

rotating said rotating member while adhering said array of food product slices until said array of slices is disposed opposite a substrate; and, urging said array of food product slices off of said rotating member transfer surface to deposit said array onto said substrate without substantially altering positions of said multiple food product slices within said array.

22. The method of claim 21, wherein said substrate is fed opposite said rotating member in synchronization with rotation of said rotating member and said rotating member contacts said substrate during rotation thereof.

23. A method of transferring multiple food product slices arranged in a prearranged pattern from a slicing station where the multiple slices are sliced in the pattern from a supply source containing multiple food supply members of a dry, food product to a support member, without substantially altering said pattern, comprising the steps of:

providing a food product supply source wherein multiple food product supply members are held in said pattern such that each food product supply member is arranged relative to all of said food product supply members;

supplying said pattern of said food product slices to a food slice pattern pickup location by contacting said supply source with a slicing means;

providing a rotating transfer member having a curved outer transfer surface adjacent the food slice pattern pickup location;

engaging said pattern of food product slices on said transfer surface by having a vacuum at one area of said transfer member to adhere said food product slice pattern cut from said supply source onto said transfer surface;

rotating said transfer member to transfer said food product slice pattern from said food slice pattern pickup location to a food slice pattern transfer location; and, urging said pattern of food slices off of said transfer member onto said support member within a predesignated target area defined thereon without substantially altering said pattern of food product slices.

24. A method for the production of food setups wherein the setups comprise several distinct layers of food product slices arranged vertically within a predesignated target area on a substrate, the method comprising the steps of:

providing a food product supply source containing a set of food product supply members arranged within said source in a rearranged pattern;

slicing a array of multiple food product slices from said food product supply source in said prearranged pattern;

providing a rotatable transfer member proximate to said food product supply source, said transfer member having means to generate a vacuum on an outer surface thereof to adhere multiple food product slices thereon;

adhering said prearranged pattern of slices to said rotatable transfer member outer surface and transferring said prearranged pattern of slices to a location opposite a conveyor means;

depositing said prearranged pattern of slices onto said conveyor means without substantially altering said prearranged pattern;

conveying said prearranged pattern of slices to subsequent locations disposed along said conveyor means, and;

depositing at each of said subsequent locations, subsequent prearranged patterns of food product slices sliced from subsequent food product supply sources onto said prearranged pattern to form a set-up having multiple arrays of vertically disposed food product slices arranged in said prearranged patterns.

25. An apparatus for transferring a plurality of food product slices arranged in a prearranged pattern, the plurality of slices being cut by a slicing means from a multiple food product supply containing multiple food product supply members and transferring the slices to a predesignated deposit location without substantially altering positions of said multiple food product slices relative to each other, comprising:

means for holding said multiple food product supply members in a arranged pattern;

means for slicing said multiple food product supply members into discrete, multiple food product slices;

means for transferring said multiple slices after slicing onto a substrate without substantially altering said prearranged pattern, wherein said transfer means includes a rotating member having an exterior transfer surface rotating around an inner core, said inner core including means for supplying negative air pressure to the rotating member core, said rotating member having a plurality of apertures disposed in the exterior transfer surface thereof which communicate said negative air pressure supply means with said exterior transfer surface to create a zone of adhesion on said exterior transfer surface sufficiently large enough to receive said multiple food product slices in said prearranged pattern.

* * * * *